(12) United States Patent
Andersson et al.

(10) Patent No.: US 7,905,545 B2
(45) Date of Patent: Mar. 15, 2011

(54) VEHICLE SEAT ASSEMBLY HAVING A MOUNTING MEMBER TO MOUNT AN ELECTRIC COMPONENT

(75) Inventors: Christer Andersson, Trollhattan (SE); Odd Jaegtnes, Nygard (SE); Torbjoern Andersson, Trollhattan (SE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 12/209,335

(22) Filed: Sep. 12, 2008

(65) Prior Publication Data

US 2010/0066149 A1 Mar. 18, 2010

(51) Int. Cl.
*A47C 31/00* (2006.01)
(52) U.S. Cl. .............. 297/217.3; 297/180.1; 297/180.13; 297/180.14; 297/452.42; 297/452.52
(58) Field of Classification Search ................ 297/463.1, 297/463.2, 180.1, 180.13, 180.14, 217.3, 297/452.42
See application file for complete search history.

(56) References Cited

U.S. PATENT DOCUMENTS

| | | | | |
|---|---|---|---|---|
| 2,992,605 | A * | 7/1961 | Trotman et al. | 454/120 |
| 5,314,403 | A * | 5/1994 | Shaw | 601/148 |
| 5,387,026 | A * | 2/1995 | Matsuhashi et al. | 297/217.4 |
| 5,924,766 | A * | 7/1999 | Esaki et al. | 297/180.13 |
| 6,050,890 | A * | 4/2000 | Bayer et al. | 454/120 |
| 6,644,735 | B2 * | 11/2003 | Bargheer et al. | 297/180.13 |
| 6,736,452 | B2 * | 5/2004 | Aoki et al. | 297/180.13 |
| 7,261,372 | B2 * | 8/2007 | Aoki | 297/180.14 |
| 7,275,984 | B2 * | 10/2007 | Aoki | 454/120 |
| 7,322,643 | B2 * | 1/2008 | Ishima et al. | 297/180.1 |
| 7,413,248 | B2 * | 8/2008 | Matsuhashi | 297/217.4 |
| 2006/0138812 | A1 | 6/2006 | Aoki | |
| 2007/0101729 | A1 | 5/2007 | Aoki et al. | |
| 2008/0164733 | A1 | 7/2008 | Giffin | |

FOREIGN PATENT DOCUMENTS

DE 29718853 U1 1/1998

OTHER PUBLICATIONS

German Patent and Trademark Office, Office Action for the corresponding German Patent Application No. 10 2009 037 405.1-16 mailed Oct. 7, 2010.

* cited by examiner

*Primary Examiner* — Laurie K Cranmer
(74) *Attorney, Agent, or Firm* — Brooks Kushman P.C.

(57) ABSTRACT

A vehicle seat assembly includes a seat body that is configured for attachment to a floor surface of a vehicle. The seat body includes a seat back that is connected to a seat bottom. The seat back has a seat back frame and the seat bottom has a seat bottom frame. An electric component is mounted to the seat body. A first mounting member attaches the electric component to one of the seat back frame and the seat bottom frame. In this vehicle seat assembly, the first mounting member is configured to flex such that the electric component can move in a direction that is generally perpendicular to a plane of the one of the seat back frame and the seat bottom frame.

20 Claims, 4 Drawing Sheets

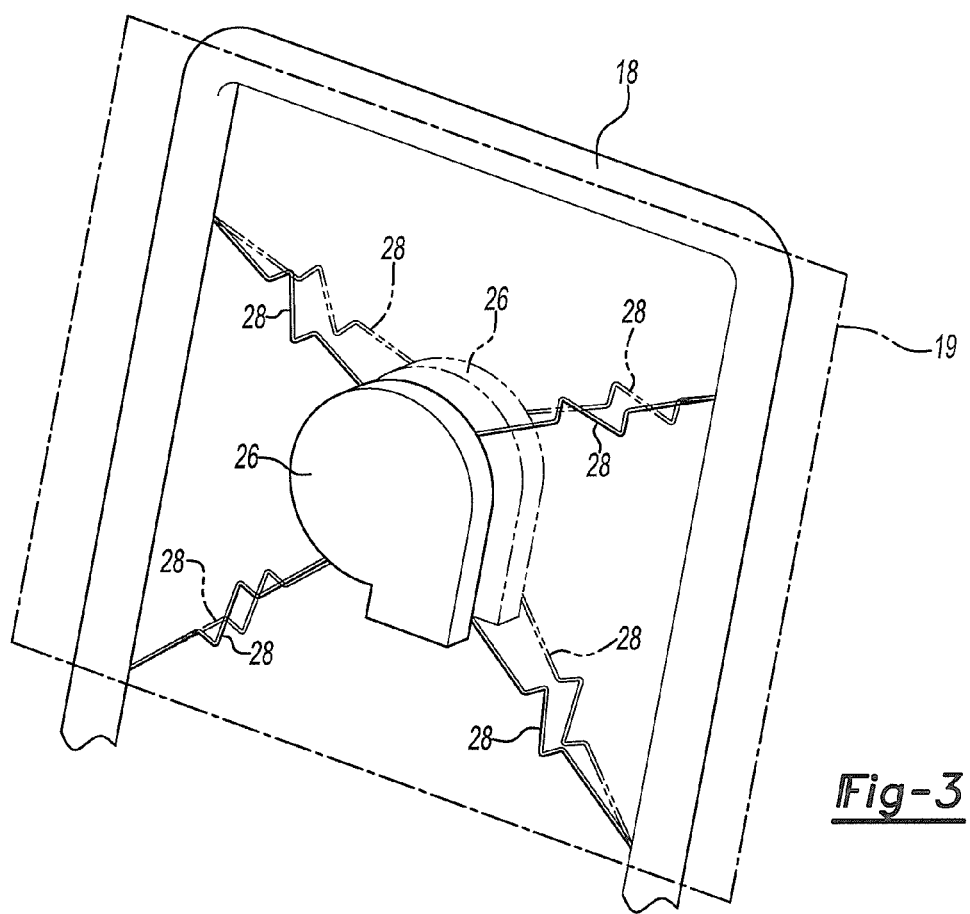
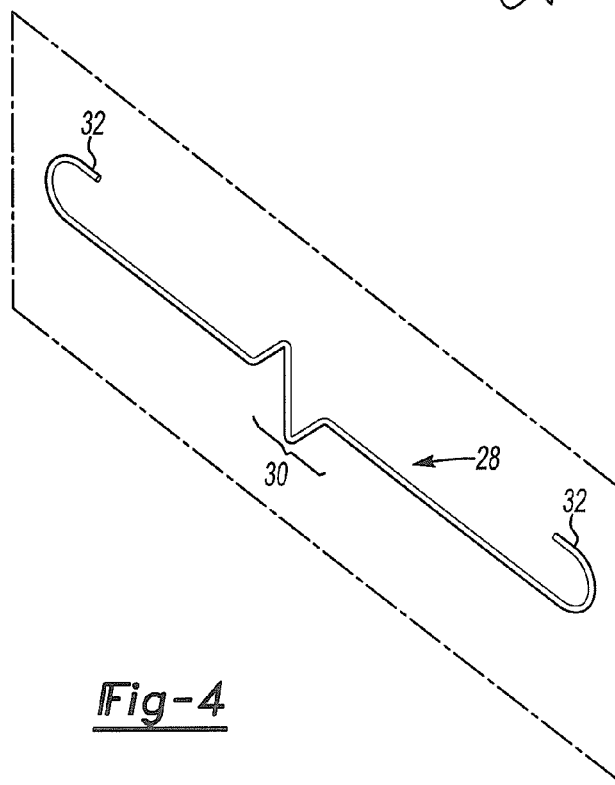

VEHICLE SEAT ASSEMBLY HAVING A MOUNTING MEMBER TO MOUNT AN ELECTRIC COMPONENT

BACKGROUND OF THE INVENTION

1. Field of the Invention

Embodiments of the present invention relate to the field of seat assemblies having electric components attached thereto using members that reduce the communication of vibrations from the electric component through a cushion to an occupant of the seat assembly.

2. Background Art

Increasingly, vehicle seat assemblies include greater numbers of features such as electric motors to facilitate power fore and aft adjustability of the entire vehicle seat assembly, electric motors to facilitate power recline adjustability for seat backs and power lumbar adjustment, and electric heating and cooling capabilities. Many of these components include electric motors that have rotating parts which can impart vibrations to the vehicle seat assembly. For instance, an electric blower motor may include components such as a fan blade which rotates for the purpose of circulating air through the vehicle seat assembly. In some embodiments, the fan blade is mounted to a cushion in the seat back or seat bottom. Mounting the blower motor in the seat assembly such that it contacts the cushion provides a medium to directly transfer vibrations from the blower motor to an occupant of the seat assembly.

It is preferable to mount the electric components to the frame of either the seat back or the seat bottom. Mounting the electric component in this manner permits the vibrations to be directed downwardly through the frame to the floor of the vehicle. In some embodiments, brackets are attached to the seat frame for the purpose of mounting the electric component to the seat frame. A potential problem with mounting an electric component in this manner is that such mounting brackets rigidly support the electric component to the seat frame. In the event of certain movements by the seat occupant such as the movement that typically occurs when a seat occupant puts on or removes a garment or such as the movement that may occur during jostling or other vehicle operations may cause the seat occupant's back or posterior (depending upon where the electric component is mounted) to detect the presence of such electric component as the cushion compresses. Thus, mounting the electric component in with rigid brackets may cause discomfort.

In view of the foregoing, it is desirable to mount an electric component to a vehicle seat assembly in a manner that isolates the component from the cushion yet affords the component the flexibility to move away from a seat occupant as the cushion compresses against the component. Embodiments of the present invention address these and other problems.

SUMMARY OF THE INVENTION

Embodiments of a vehicle seat assembly are disclosed herein. In a first embodiment, the vehicle seat assembly comprises a seat body that is configured for attachment to a floor surface of a vehicle. The seat body includes a seat back that is connected to a seat bottom. The seat back has a seat back frame and the seat bottom has a seat bottom frame. An electric component is mounted to the seat body. A first mounting member attaches the electric component to one of the seat back frame and the seat bottom frame. In this first embodiment, the first mounting member is configured to flex such that the electric component can move in a direction that is generally transverse to a plane containing the one of the seat back frame and the seat bottom frame to which the electric component is attached.

In an implementation of the first embodiment, the first mounting member is configured to flex longitudinally.

In another implementation of the first embodiment, the first mounting member includes a spring portion. In a variation, the first mounting member comprises spring steel. In another variation, the spring portion is coplanar with a remainder of the first mounting member.

In another implementation of the first embodiment, the vehicle seat assembly further comprises a second mounting member that cooperates with the first mounting member to attach the electric component to the one of the seat back frame and the seat bottom frame. In a variation of this implementation, the vehicle seat assembly further comprises a third mounting member and a fourth mounting member that cooperate with the first mounting member and the second mounting member to attach the electric component to the one of the seat back frame and the seat bottom frame.

In another implementation of the first embodiment, the electric component is an electric fan.

In a second embodiment, the vehicle seat assembly comprises a seat body that is configured for attachment to a floor surface of a vehicle. The seat body includes a seat back that is connected to a seat bottom. The seat back has a cushion and a seat back frame supporting the cushion. An electric component is mounted to the seat back. A first mounting member attaches the electric component to the seat back frame. In this second embodiment, the first mounting member is configured to flex such that the electric component can move in a direction generally perpendicular to a plane containing the seat back frame.

In an implementation of the second embodiment, the first mounting member supports the electric component in a position that is spaced apart from the cushion such that the electric component is out of direct contact with the cushion. In a variation of this implementation, the vehicle seat assembly further comprises a cushion mounting member that attaches the cushion to the seat back frame. In this embodiment, the electric component is out of direct contact with both the cushion mounting member and the cushion.

In another implementation of the second embodiment, the first mounting member is configured to flex longitudinally.

In another implementation of the second embodiment, the first mounting member comprises spring steel and the first mounting member includes a spring portion. In a variation of this implementation, the spring portion is coplanar with a remainder of the first mounting member.

In another implementation of the second embodiment, the vehicle seat assembly further comprises a second mounting member that cooperates with the first mounting member to attach the electric component to the seat back frame.

In another implementation of the second embodiment, the electric component is an electric fan.

In a third embodiment, the vehicle seat assembly comprises a seat body that is configured for attachment to a floor surface of a vehicle. The seat body includes a seat back that is connected to a seat bottom. The seat back has a seat back frame and a seat back defines a cavity. An electric component is disposed within the cavity. A first mounting member attaches the electric component to the seat back frame such that the electric component is suspended within the cavity so as to be out of contact with the surface defining the cavity. In this third embodiment, the first mounting member is configured to flex such that the electric component can move in a direction generally perpendicular to a plane of the seat back frame.

In an implementation of the third embodiment, the vehicle seat assembly further comprises a second mounting member that cooperates with the first mounting member to attach the electric component to the seat back frame. In a variation of this implementation, the first mounting member and the second mounting member each include a spring portion and the first mounting member and the second mounting member are configured to flex longitudinally. In a further variation, the electric component is an electric fan and the first mounting member comprises spring steel.

BRIEF DESCRIPTION OF THE DRAWINGS

The description herein makes reference to the accompanying drawings wherein like reference numerals refer to like parts throughout the several views, and in which:

FIG. 3 is a perspective view illustrating movement of an electric component attached to the seat back frame of the vehicle seat assembly illustrated in FIG. 1;

FIG. 4 is a perspective view illustrating a coplanar relationship between a spring portion and a non-spring portion of the mounting member illustrated in FIGS. 3A-B;

DETAILED DESCRIPTION OF THE PREFERRED EMBODIMENT(S)

Figure 1:
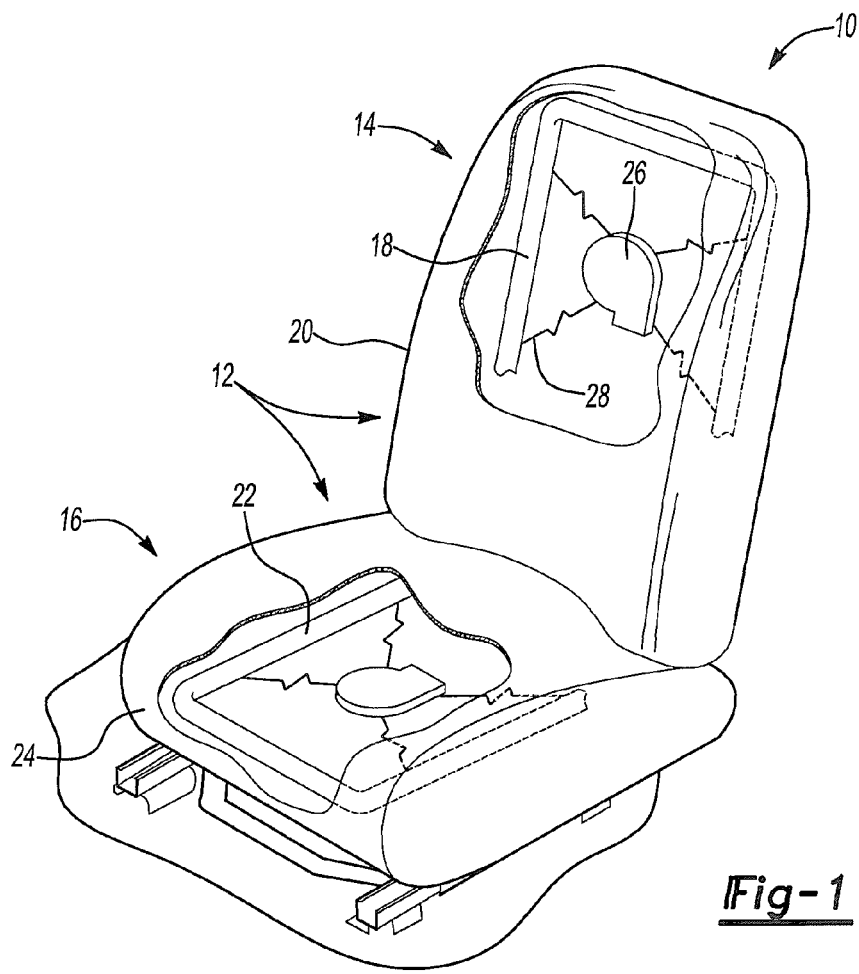
FIG. 1 is a perspective view illustrating an embodiment of a vehicle seat assembly made in accordance with the teachings of the present invention.

Detailed embodiments of the present invention are disclosed herein; however, it is to be understood that the disclosed embodiments are merely exemplary of the invention that may be embodied in various and alternative forms. The figures are not necessarily drawn to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

It is desirable to avoid the transmission of vibrations from electric components incorporated into a vehicle seat assembly through the cushion to the seat occupant during operation of the electric components. When an electric component is mounted directly to the cushion or is otherwise in direct contact with the cushion, vibrations are transmitted to the seat occupant when the electric component is operated. One technique used to avoid the communication of these vibrations to the seat occupant is to attach brackets to the seat frame and attach the electric component to the brackets. While this may avoid the transmission of vibrations to a seat occupant through the cushion, such brackets are typically mounted between two support members of the seat frame with the electric component being mounted between the two support members, thus placing the brackets and the electric component in the path of the cushion as it compresses. While this may not present any problem during normal vehicle operations, in the event of rapid or irregular movement, it is possible for such loads to cause compression and deflection of the seat cushion such that the cushion compresses against the electric component. Such compression may be detectable by the seat occupant and may cause discomfort. It is therefore desirable to avoid obstructing the compression/deflection path of the cushion.

Embodiments of the present invention address both the problem of transmitting vibrations to a seat occupant through the seat cushion and the problem of rigidly mounting a seat component in the compression/deflection path of the seat cushion. In accordance with the teachings of the present invention, a mounting member, such as a rod made of spring steel, having a spring element, such as a bend or kink in the rod, may be used to mount the electric component to the seat back frame or the seat bottom frame. The mounting member may suspend the electric component from the seat frame and hold it in a substantially rigid manner. In some embodiments, the electric component may be suspended from the frame member so as to be disposed spaced apart from the seat cushion, thus allowing the seat cushion to deflect by some predetermined amount without encountering the electric component.

By including a spring portion in the mounting member, the mounting member is configured to elongate longitudinally. Such longitudinal elongation allows the electric component to deflect away from the cushion as the cushion compresses against the electric component.

When the impact force acting on the seat subsides, and the cushion decompresses, the spring portion of each mounting member contracts and the mounting member returns to its original configuration, thus returning the electric component to its initial position. In this manner, an electric component can be mounted in a vehicle seat assembly so as to avoid directly communicating vibrations to the seat occupant through the cushion without the inflexibility or rigidity attendant the use of mounting brackets suspended from the seat frame. A greater understanding of the embodiments of the invention described herein may be gained through a review of the detailed description of the accompanying figures set forth below.

With respect to FIG. 1, vehicle seat assembly 10 is illustrated in perspective view. Vehicle seat assembly 10 may be used in any type of automobile including, but not limited to, sedans, coupes, sport utility vehicles, pickup trucks, crossover utility vehicles, convertibles, vans and buses. Additionally, the teachings of the present invention are not only compatible with automobiles, but are also compatible with other modes of transportation including other types of land craft including rail driven vehicles. The teachings of the present invention are also compatible with water craft, aircraft and spacecraft.

Vehicle seat assembly 10 includes a vehicle seat body 12 including a seat back 14 and a seat bottom 16. Seat back 14 is connected to seat bottom 16. In some embodiments, seat back 14 is substantially unadjustable. In other embodiments, seat back 14 may be configured to rotate with respect to seat bottom 16 to permit a vehicle seat occupant to recline seat back 14 to a comfortable position. Seat back 14 includes a seat back frame 18 supporting a seat back cushion 20 as well as other components, discussed in detail below. Seat back frame 18 forms a plane 19 (see FIG. 3). Seat bottom 16 includes a seat bottom frame 22 that supports a seat bottom cushion 24 and is also configured for attachment to a support structure such as a rail assembly which may be used to slidably mount vehicle seat assembly 10 to a floor surface in a vehicle. Seat bottom frame 22 may also support other components such as electric motors, wire assemblies and duct work.

In the embodiment illustrated in FIG. 1, an electric blower motor 26 is mounted to seat back frame 18. Although an electric blower motor is described and illustrated herein, it should be understood that the teachings of the present invention are equally compatible with other electric components. Electric blower motor 26 may be used to heat or cool seat back 14 and seat bottom 16 by the circulation of forced air through a network of duct work (not shown). Electric blower motor 26 is the type of electric component that can generate vibrations of the sort that manufacturers may seek to isolate a seat occupant from. Electric blower motor 26 is mounted to seat back frame 18 by four mounting members 28 generally attached to the four corners of electric blower 26.

With respect to FIGS. 2A-B, 3, and 4 mounting members 28 are illustrated in side and perspective views. With respect to FIG. 2A, mounting member 28 is illustrated in a relaxed state. Mounting member 28 includes a spring portion 30. In the illustrated embodiment, spring portion 30 is configured as a zigzag type bend in mounting member 28. In other embodiments, spring portion 30 may not have a zigzag configuration, but rather may include a coil spring configuration or any other curvilinear shape effective to allow mounting member 28 to extend longitudinally when in tension.

Mounting member 28 may be a single, integrally formed member or may comprise multiple members joined together in any conventional manner including, but not limited to, the use of mechanical fasteners and welding. Mounting members 28 also include mounting portions 32. In the illustrated embodiments, mounting portions 32 comprise generally hooked ends which may be hooked around portions of seat back frame 18. In other embodiments, mounting portions 32 may include eyelets to receive fasteners or may have other configurations suitable for mounting to seat back frame 18.

Mounting member 28 may be made from any substantially rigid material including, but not limited to, metals such as spring steel, titanium or an alloy of aluminum. It should be understood that mounting member 28 need not be made of metal. Mounting member 28 may be made in part or entirely of a polymeric material including, but not limited to, polystyrene or polycarbonate. Alternatively, mounting member 28 may be fabricated from components of different materials. For instance, the mounting portions 32 may be made of a polymeric material while the spring portion 30 may be made of metal or elastic fabric.

Figure 2A:
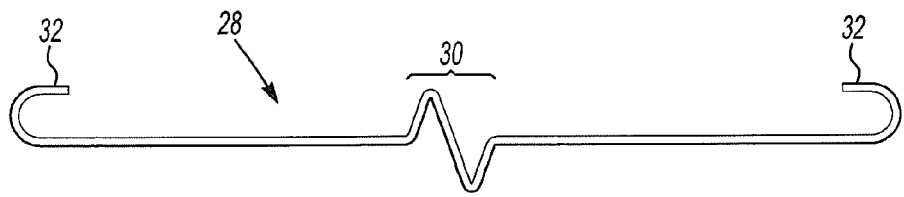
FIGS. 2A-B are side views illustrating longitudinal elongation of the mounting members used to attached the electric component to a seat frame supporting a seat back of the vehicle seat assembly of FIG. 1.
Figure 2B:
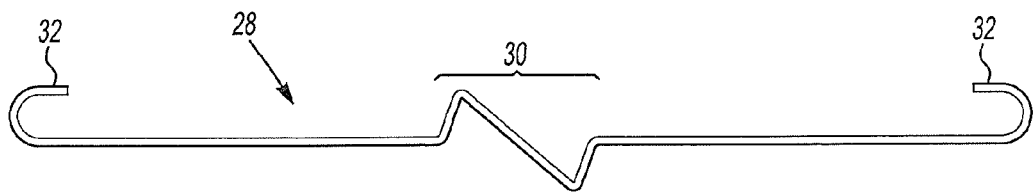

With respect to FIG. 2B, the mounting member 28 of FIG. 2A is illustrated in a loaded configuration. In FIG. 2B, the longitudinal elongation of member 28 is illustrated. In this embodiment, as spring portion 30 is stretched out and elongates, the two mounting portions 32 move away from one another with the result that mounting member 28 becomes elongated longitudinally.

The effects of such longitudinal elongation of mounting member 28 is illustrated in FIG. 3. FIG. 3 illustrates a portion of seat back 14 including seat back frame 18, electric blower motor 26 and four mounting members 28. Electric blower motor 26 and mounting members 28 are drawn in solid lines to illustrate the design or relaxed position of electric blower motor 26 as it is suspended from a seat frame 18. Electric blower motor 26 and mounting members 28 are also illustrated in phantom lines to illustrate the movement of electric blower motor 26 in a direction away from an anticipated shock force acting on seat back 18 such as may occur when the vehicle is jostled as it traverses rough terrain or a speed bump, for instance. As illustrated, when loaded, electric blower motor 26 moves in a direction that is generally transverse to a plane containing seat back frame 18. As illustrated in phantom lines, mounting members 28 elongate under the load and the spring portions 30 stretch in reaction to the impact force. As set forth above, once the impact force abates, electric blower motor 26 returns to its design or relaxed position.

With respect to FIG. 4, mounting member 28 is illustrated in perspective view. Spring portion 30 is coplanar with mounting portions 32. In fact, in this embodiment, a single plane bisects mounting member 28 in its entirety. By configuring spring portion 30 to be coplanar with the remainder of mounting member 28, less space is needed in the seat back 18 to accommodate mounting member 28.

Figure 5:
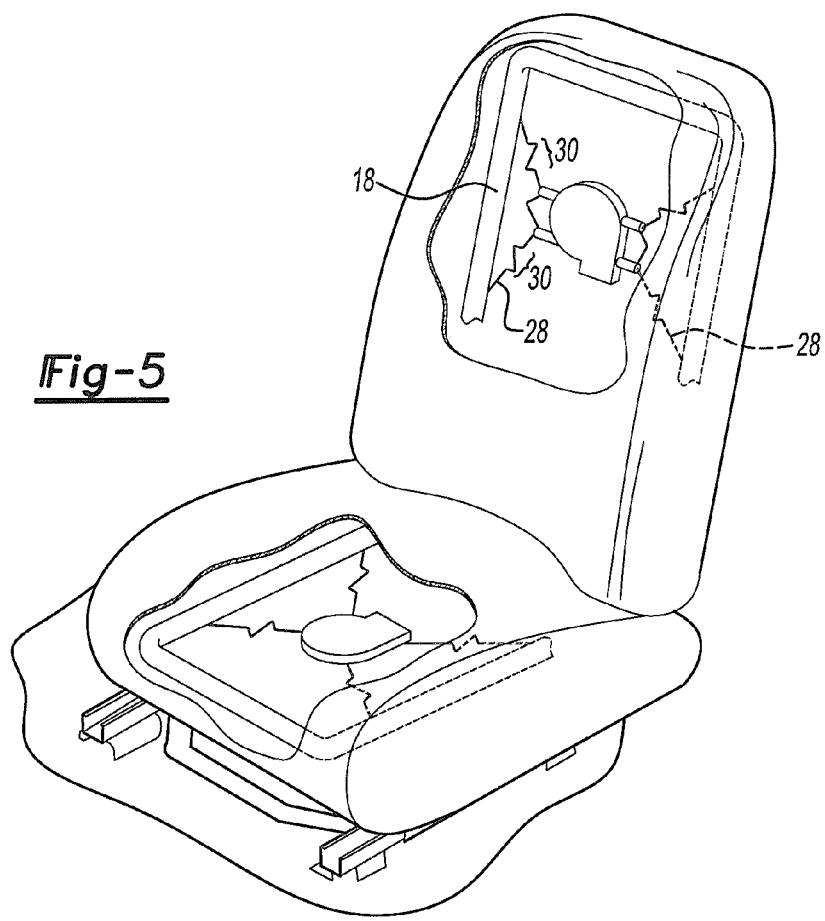
FIG. 5 is a perspective view illustrating the vehicle seat assembly of FIG. 1 including an alternate embodiment of the mounting members.

With respect to FIG. 5, an alternate embodiment of mounting member 28 is illustrated. In this embodiment, mounting member 28 includes two spring portions 30. A single mounting member 28 can be used to affix two of the four corners of the electric blower motor 26 to seat frame 18. Another mounting member 28, also having two spring portions 30 can be affixed to the other two corners of electric blower motor 26 and then attached to seat back frame 18.

It is desirable to mount electric blower motor 26 in a substantially rigid manner to seat back frame 18 and to have electric blower motor 26 move only in response to the shock forces discussed above. To accomplish this, some embodiments of mounting member 28 may have spring portions 30 having a spring constant of between 5 and 15 N/mm. In other embodiments, the spring portion may have a spring constant of between 8 and 12 N/mm. In still other embodiments, the spring portion may have a spring constant of 10 N/mm.

Figure 6:
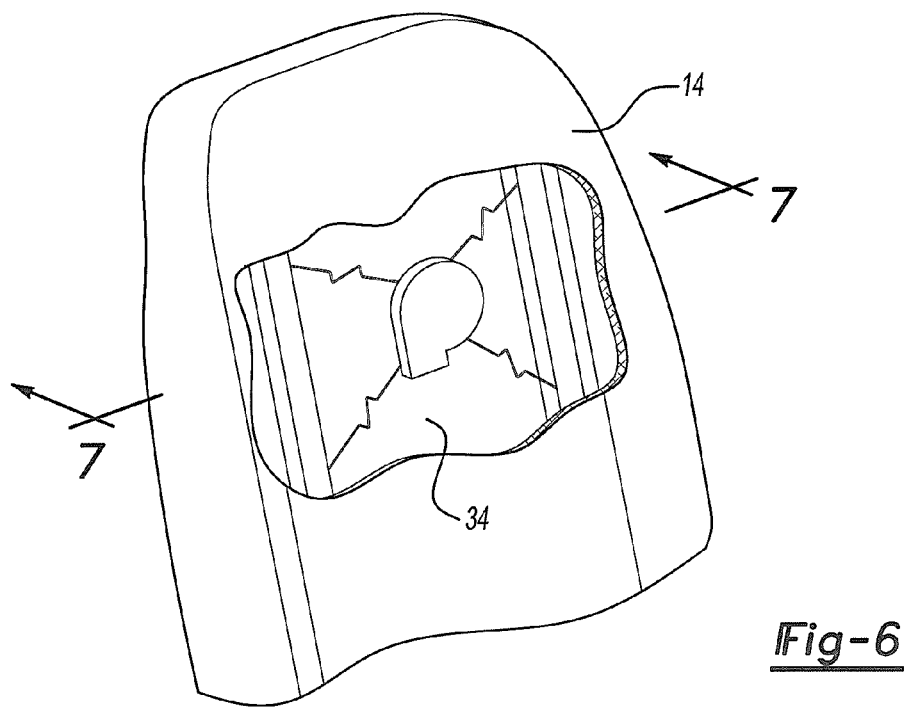
FIG. 6 is a perspective, fragmentary, cutaway view illustrating a rear view of the seat back illustrated in FIG. 1 with portions of the seat back cutaway to illustrate the electric component mounted within a cavity in the seat back.

With respect to FIG. 6, a perspective view of seat back 14 is illustrated with portions cutaway to illustrate a cavity 34 defined within seat back 14. In some embodiments, it may be desirable to mount electric blower motor 26 or other electric components so that it is suspended within cavity 34 and out of in direct contact with any surface defining cavity 34. Mounting electric blower motor 26 in this manner reduces the possibility of vibrations resulting from the operation of electric blower motor 26 from being communicated to a vehicle seat occupant through seat back cushion 20.

Figure 7:
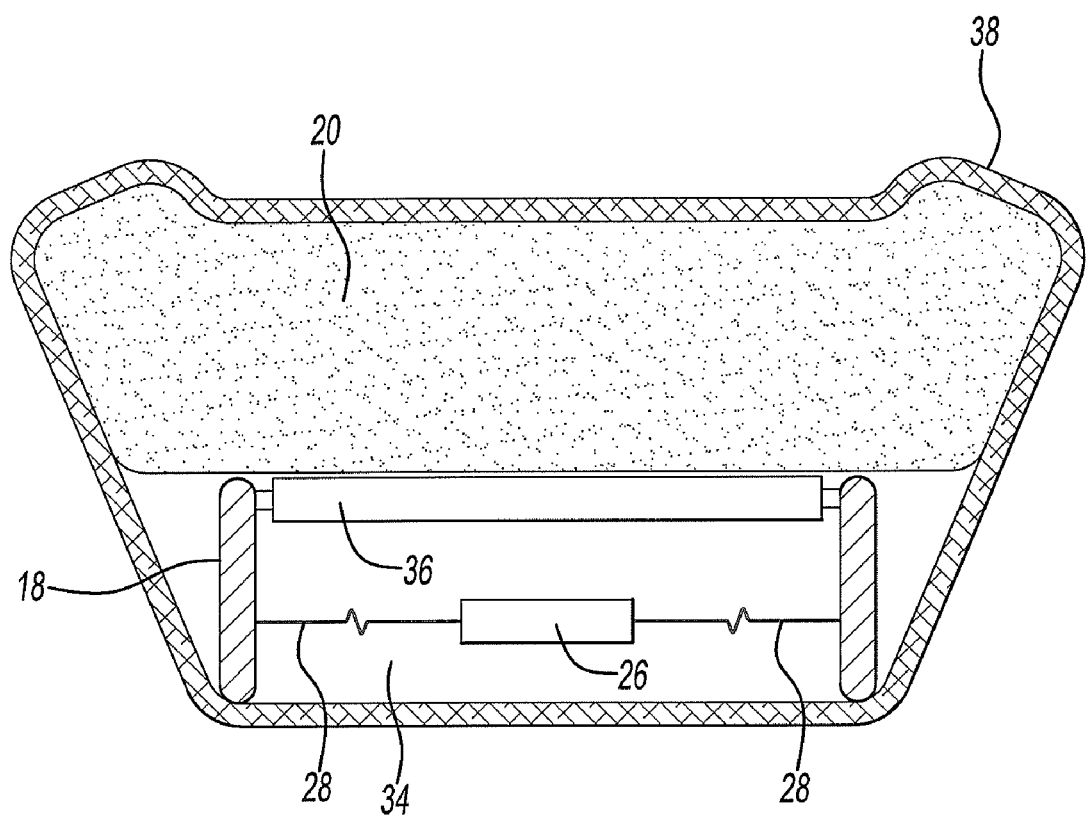
FIG. 7 is a cross-sectional view taken along the line 7-7 of FIG. 6 illustrating the relationship between the electric component and the surfaces defining the cavity in the seat back.

This isolation is best seen in FIG. 7, which is a cross-section of seat back 14 taken along the line 7-7 of FIG. 6. In this embodiment, seat back cushion 20 is mounted to seat frame 18 through the use of a cushion mounting member 36. Cushion mounting member 36 may be any suitable fabric material. Cushion 20 is mounted to cushion mounting member 36 which, in turn, is mounted to seat back frame 18. A trim material 38 surrounds seat back cushion 20, seat back frame 18, cushion mounting member 36 and electric blower motor 26. In this illustration, cavity 34 is defined by seat back frame 18, cushion mounting member 36 and trim material 38. As illustrated in FIG. 7, electric blower motor 26 has no direct contact with either cushion 20 or cushion mounting member 36, but rather, is suspended in isolation from two of the four surfaces forming cavity 34. The only component that electric blower motor 26 has contact with is seat back frame 18. Any vibrations generated by electric blower motor 26 during normal operations are transmitted to seat back frame 18 and down vehicle seat assembly 10 into the floor surface of the vehicle.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly comprising:
   a frame;
   a cushion mounting member disposed on the frame that supports a cushion;
   a blower motor; and
   a first mounting member having a first end disposed on the frame, a second end disposed opposite the first end that is disposed on the blower motor, and a spring element disposed between the first and second ends;
   wherein the first mounting member has a substantially planar configuration in an unflexed condition and does not support a seat occupant; and
   wherein the blower motor and first mounting member are spaced apart from the cushion and the cushion mounting member.

2. The vehicle seat assembly of claim 1 wherein the first mounting member is configured to flex longitudinally.

3. The vehicle seat assembly of claim 1 wherein the first and second ends include first and second hooks.

4. The vehicle seat assembly of claim 3 wherein the first and second hooks extend in opposite directions.

5. The vehicle seat assembly of claim 1 wherein the first mounting member comprises spring steel.

6. The vehicle seat assembly of claim 1 further comprising a second mounting member having a first end disposed on the frame, a second end disposed opposite the first end that is disposed on the blower motor, and a spring element disposed between the first and second ends, wherein the second mounting member is coplanar with the first mounting member.

7. The vehicle seat assembly of claim 6 further comprising a third mounting member and a fourth mounting member cooperating with the first mounting member and the second mounting member to attach the blower motor to the frame.

8. A vehicle seat assembly comprising:
   a frame that defines first and second sides of a cavity;
   an electric component; and
   first and second mounting members extending from opposing sides of the electric component to the frame;
   wherein the first and second mounting members each have a first end and a second end disposed opposite the first end, wherein the first and second ends of the first mounting member are disposed on the frame on the first side of the cavity and the first and second ends of the second mounting member are disposed on the frame on the second side of the cavity such that the first and second mounting members do not extend completely across the cavity.

9. The vehicle seat assembly of claim 8 wherein the electric component is an electric fan.

10. The vehicle seat assembly of claim 8 wherein the first mounting member supports the electric component in a position spaced apart from the cushion such that the electric component is out of direct contact with the cushion.

11. The vehicle seat assembly of claim 10 further comprising a cushion mounting member attaching the cushion to the seat back frame and wherein the electric component is out of direct contact with both the cushion mounting member and the cushion.

12. The vehicle seat assembly of claim 8 wherein the first mounting member is configured to flex longitudinally.

13. The vehicle seat assembly of claim 8 wherein the first mounting member includes a first spring portion disposed between the first end and the electric component and a second spring portion disposed between the second end and the electric component.

14. The vehicle seat assembly of claim 8 wherein the first mounting member is coupled to the electric component at two points.

15. The vehicle seat assembly of claim 8 wherein the second mounting member is coupled to the electric component at two points.

16. The vehicle seat assembly of claim 15 wherein the second mounting member includes a first spring portion disposed between the first end and the electric component and a second spring portion disposed between the second end and the electric component.

17. A seat assembly comprising:
   a frame that defines a cavity;
   a blower motor disposed within the cavity and spaced apart from the frame and a cushion; and
   a set of mounting members that each have a first end disposed on the frame, a second end disposed on the blower motor and a spring portion disposed between the first and second ends for suspending the blower motor within the cavity; wherein the set of mounting members do not support a seat occupant thereby isolating vibration of the blower motor from the seat occupant;
   wherein the set of mounting members is configured to flex such that the blower motor can move in a direction generally perpendicular to a plane containing the frame.

18. The seat assembly of claim 17 wherein each spring portion is disposed between opposing ends of each mounting member.

19. The seat assembly of claim 18 wherein the spring portion and each mounting member is completely disposed in a plane.

20. The seat assembly of claim 17 wherein the each mounting member comprises spring steel.

* * * * *